A. C. PRATT.
MACHINE FOR MAKING LINK MESH.
APPLICATION FILED AUG. 26, 1912.
1,071,790.
Patented Sept. 2, 1913.
3 SHEETS—SHEET 1.
Fig. 1,
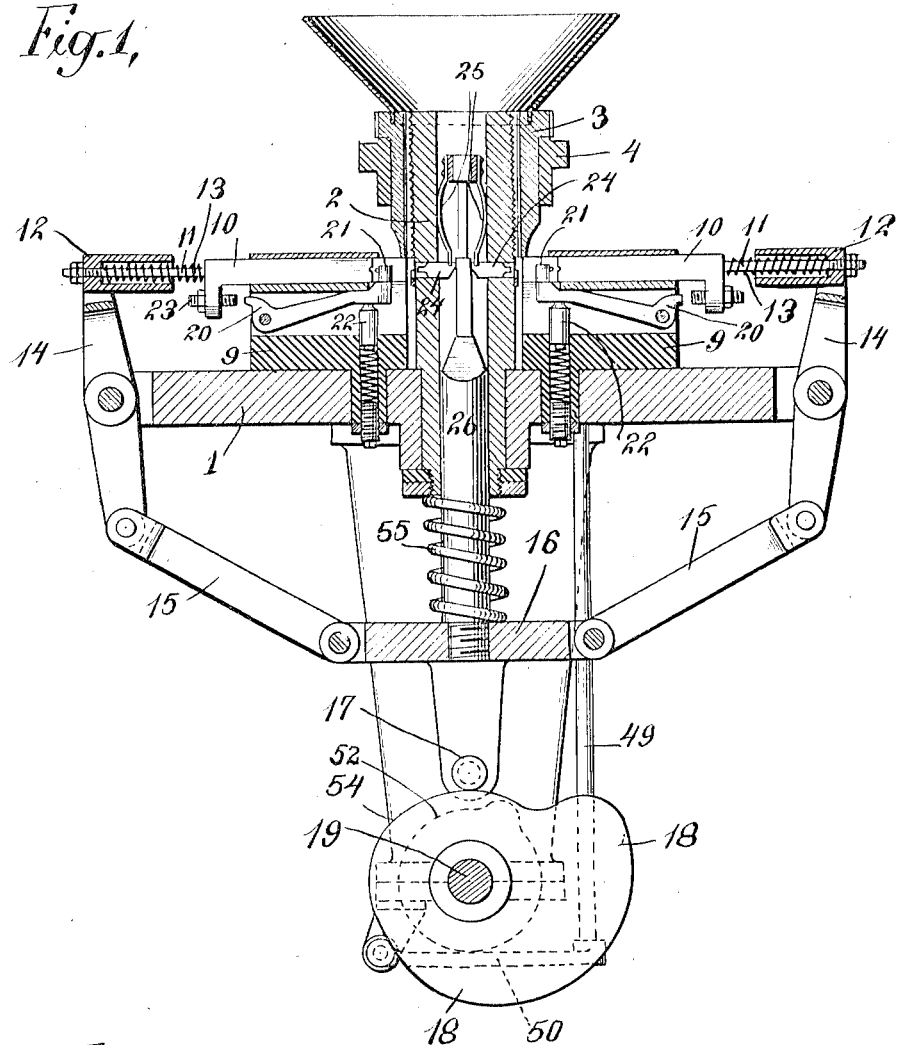
Fig. 2,
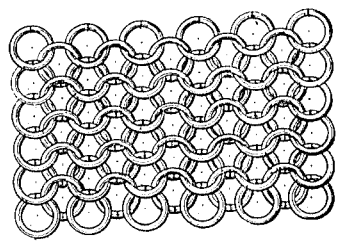
WITNESSES
INVENTOR
A. C. Pratt,
BY
ATTORNEY A. C. PRATT.
MACHINE FOR MAKING LINK MESH.
APPLICATION FILED AUG. 26, 1912.
1,071,790.
Patented Sept. 2, 1913.
3 SHEETS—SHEET 2.
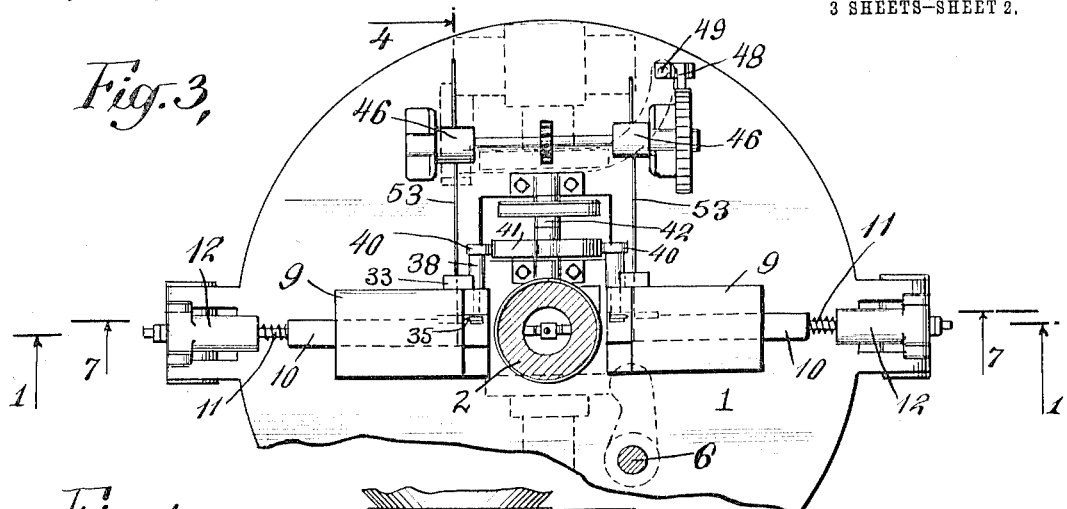
Fig. 3,
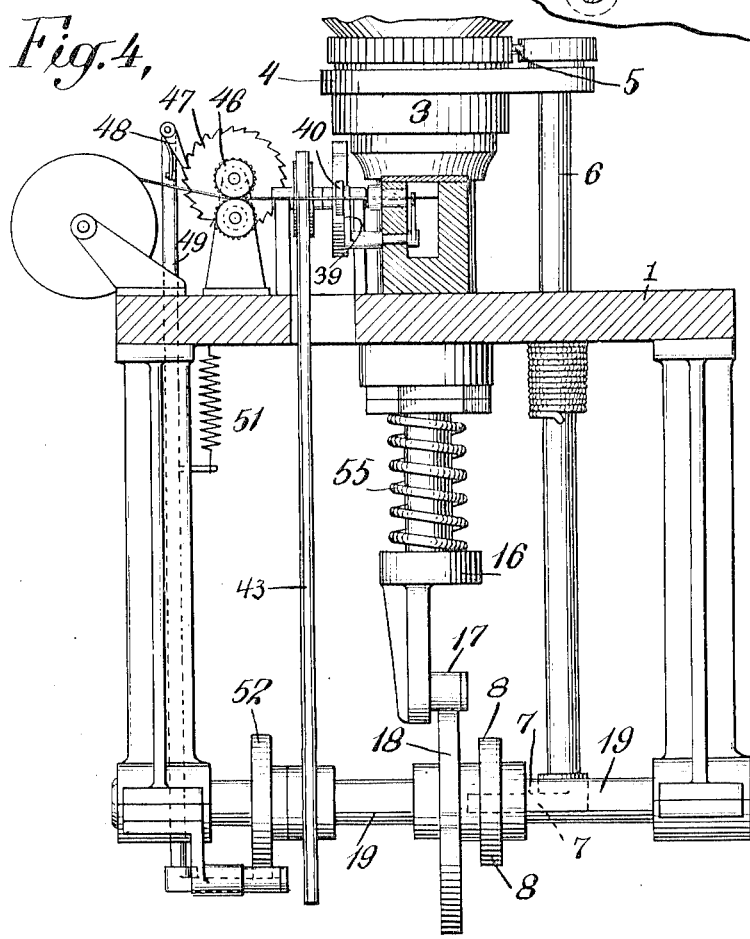
Fig. 4,
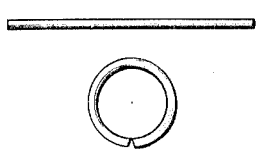
Fig. 8,
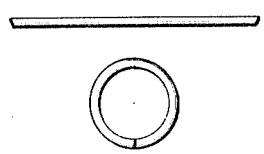
Fig. 9,
WITNESSES
J. F. Collins
F. B. Spencer
INVENTOR
A. C. Pratt,
BY
Edward W. Edwards
ATTORNEY A. C. PRATT.
MACHINE FOR MAKING LINK MESH.
APPLICATION FILED AUG. 26, 1912.
1,071,790.
Patented Sept. 2, 1913.
3 SHEETS—SHEET 3.
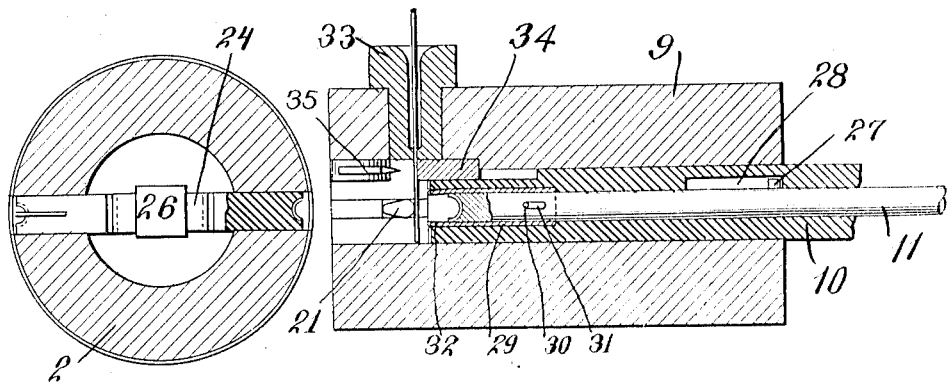
Fig. 5,
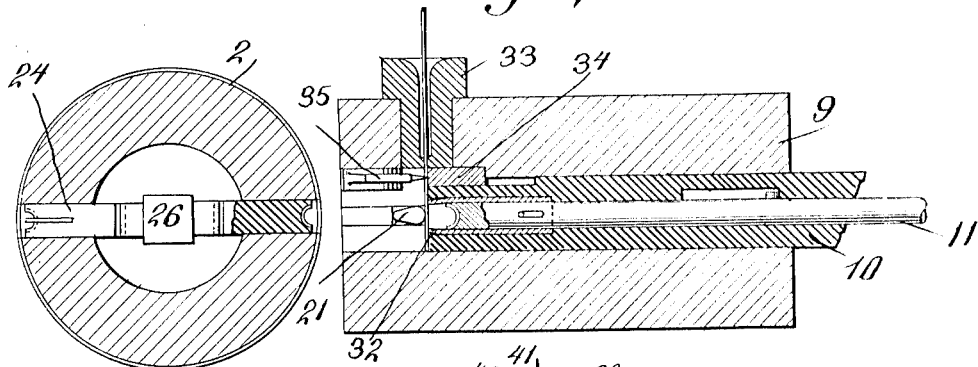
Fig. 6,
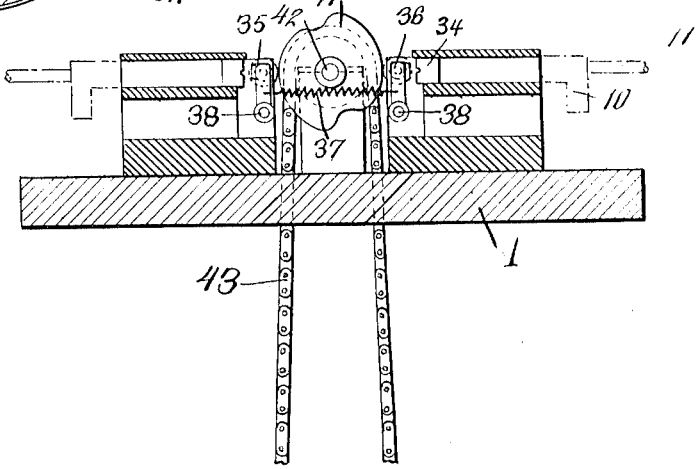
Fig. 7,
WITNESSES
INVENTOR
A. C. Pratt
BY
ATTORNEY

UNITED STATES PATENT OFFICE.

ALPHONSO C. PRATT, OF MONTCLAIR, NEW JERSEY.

MACHINE FOR MAKING LINK MESH.

1,071,790.  Specification of Letters Patent.  Patented Sept. 2, 1913.

Application filed August 26, 1912. Serial No. 716,958.

*To all whom it may concern:*

Be it known that I, ALPHONSO C. PRATT, a citizen of the United States, residing at Montclair, in the county of Essex and State of New Jersey, have invented certain new and useful Improvements in Machines for Making Link Mesh, of which the following is a specification.

This invention relates to machines for making link-mesh, and its object is to provide a machine so constructed that the mesh made thereby will be more perfect in appearance and of greater strength than the mesh heretofore made on machines.

In machines for making link-mesh as heretofore constructed, it has been common to provide a mechanism for feeding wire to the link-forming tools, then cutting off lengths of this wire, and then forming such lengths into links, each link meshing with the links of the fabric. When a piece of wire is cut off with its ends perpendicular to the length of the wire and then bent to a circular form, the two ends do not come squarely together, so that they abut over their entire surfaces, this being due to the fact that the outer circumference of the link is greater than the inner circumference. As a result of this, a slight space appears upon the exterior of the link where the two ends come together. In making mesh of this character, it is common to employ wire having a solder-core, and after the link has been formed to soften the solder at the ends of the link, so that it will run out into the space between those ends and effect a joint between them. When the space between the ends of the piece of wire which has been formed into a link is relatively great, the solder-core of the wire will not fill the space, so that even the use of solder-core wire is ineffective to completely close the link and give it a smooth and continuous surface throughout.

The present invention involves so constructing the machine that the pieces of wire cut thereby will be of such shape that when formed into a link the ends of the piece will come together so as to contact over substantially the entire surface thereof. By reason of this, the space between the two ends of the formed link is very small, not only at the inner side of the link but also at the outer side thereof. With such links, when the solder-core is softened, the entire space between the ends of the link will be filled by the solder, and when the solder is hardened the space will be completely filled. Such complete filling of the space between the ends of the links and the uniting of these ends makes the mesh formed by such links of more attractive appearance by reason of the absence of any joints in the links, and also the mesh is of much greater strength than has been possessed by mesh of the same character made in accordance with the methods heretofore pursued.

The shaping of the pieces of wire for the links so that when those pieces are bent to a circular formation their ends will come together squarely may be readily accomplished by employing a cutter for severing the length of wire into the necessary pieces, which cutter will form the ends of the pieces cut thereby at an incline to the length of the pieces. Thus, a cutter in the form of a knife may be employed, the sides of which adjacent to its cutting edge lie at a substantial angle one to another, so that the cutter is more or less wedge-shaped. In combination with such a cutter, means must be provided for holding the piece of wire, after it has been cut, in a definite relation, so that the link will be formed from the wire with the side of the piece which is of greater length forming the outer side of the link.

While the invention may be employed in machines for making link-mesh which are constructed in various ways, I prefer to employ the invention in connection with a machine of the type shown in Patent No. 948,615, granted to me February 8, 1910, and I will therefore describe my invention in detail as applied to a machine of that type. This preferred embodiment of the invention is illustrated in the accompanying drawings, in which—

Figure 1 is a central vertical section of the machine on line 1—1 of Fig. 3; Fig. 2 is a view of the mesh made upon the machine; Fig. 3 is a top view of a portion of the machine; Fig. 4 is a sectional elevation at a right angle to the section of Fig. 1, on line 4 of Fig. 3; Figs. 5 and 6 are detail views illustrating different positions of certain of the operating parts; Fig. 7 is a central vertical section on line 7—7 of Fig. 3 showing the cutting mechanism; and Figs. 8 and 9 are views showing a straight piece of wire and a link formed therefrom as made by the machines heretofore used and as made by the present machine.

Referring to these drawings, 1 indicates a table, upon which is mounted a stationary mandrel 2 having a spiral thread cut upon the exterior thereof. A sleeve 3 is mounted for rotation about the upper portion of the mandrel 2, this sleeve being provided with a plurality of vertical grooves and ridges upon the inner side thereof. Between the sleeve 3 and the mandrel 2 is a narrow space, in which the mesh lies, this mesh being in the form of a sleeve. The mesh such as that shown in Fig. 2 has spirally arranged grooves and ridges upon one surface thereof, which coact with the spiral grooves and ridges upon the mandrel 2 and longitudinal grooves and ridges upon the opposite side thereof which coact with the grooves and ridges of the sleeve 3. By reason of this, when the sleeve 3 is turned the mesh will turn with it, and as it is so turned it will be moved axially in the upward direction by the grooves upon the mandrel 2. The sleeve 3 is mounted for rotation in a ring 4, which is supported upon the table 1. Also ring 3 has ratchet-teeth formed upon the exterior thereof with which coacts a pawl 5, whereby the sleeve 3 is rotated step by step, one step after each operation of the link-forming tools, as hereinafter described. The pawl 5 is mounted upon the upper end of a rod 6, which extends downwardly through the table 1 and at its lower end is provided with an arm 7 which is held by a spring in engagement with a cam 8. This cam has a single raised portion which operates through the arm 7 and rod 6 to rock the pawl 5 the required distance at regular intervals.

On opposite sides of the mandrel 2 are blocks 9, in each of which is an opening adapted to receive a reciprocatory plunger 10. Within this plunger is an opening, in which a die-rod 11 lies. This rod is secured at its outer end to a housing 12, and a spring 13 is coiled about the die-rod between the end of the housing 12 and the adjacent end of the plunger 10. The housing 12 is connected to a lever 14 pivotally mounted upon the table 1 and having its lower end connected by a link 15 to a vertically reciprocating member 16. The member 16 has a cam-roller 17 mounted thereon, which coacts with a cam 18. In the present instance, the cam 18 is in the form of a spiral or snail in its general configuration, as hereinafter explained; it is secured upon the power-shaft 19 which is arranged for rotation in suitable bearings and is driven in any suitable manner. A spring 55 presses member 16 downwardly so as to hold roller 17 in engagement with cam 18.

In each of the blocks 9 is an opening directly below the opening provided for the reception of the plunger 10 and a lever 20 is pivotally mounted within this lower opening. On the end of the lever 20, an anvil 21 is formed, this being adapted to lie between the mandrel 2 and the adjacent end of the plunger 10, but capable of downward movement so as to be out of the path of plunger 10. Normally, the anvil 21 is held in the position in which it is shown in Fig. 1 by a spring-actuated plunger 22. At the opposite end of the lever 20, is a projection which extends outside of the opening in block 9 and is adapted to be engaged by a screw 23 located in a threaded opening in a projection upon the plunger 10. The screw 23 is of greater diameter than the width of the opening in which the lever 20 is located, so that as plunger 10 is advanced the screw 23 will first engage and operate the lever 20 and thereafter will engage the wall of block 9, so as to preclude further movement of the plunger 10.

Directly opposite the plungers 10, openings are formed in the mandrel 2, and each of these openings receives a die-member 24. The two die-members are normally retracted toward the axis of mandrel 2 by springs 25, but these two die-members may be moved outwardly by a vertically movable rod 26, which has thereon cam-surfaces adapted to engage the rear surfaces of the die-members 24. The rod 26 is secured at its lower end upon the member 16.

Referring to Figs. 5 and 6, it will be seen that the die-rod 11 has a stud 27 thereon, which enters a groove 28 in the plunger 10. Also, the die-rod 11 has a sleeve 29 upon the inner end thereof, which sleeve may move relatively to the die-rod a distance permitted by a pin 30 on the sleeve which enters a short slot 31 in the die-rod. The end of sleeve 29 is cut away on its upper and lower sides, so as to provide prongs or fingers 32 which normally project beyond the end of the die-rod. These prongs or fingers 32 are bent toward each other slightly and are tempered, so as to give them a spring action. The end of the die-rod 11 has a semicircular groove formed therein, as shown. The wire from which the links are formed is fed between the end of the plunger 10 and the mandrel 21 through a bushing 33 located in an opening in the block 9. The wire when fed in through the bushing 33 passes directly in front of a cutting-block 34 secured upon the block 9. On the opposite side of the wire is a cutting-blade 35. In the machine illustrated, two links are formed simultaneously and therefore two sets of forming-tools are provided, and also two wire-feeding and wire-cutting devices. The two wires are fed in on the same side of the machine as is shown in Fig. 3, and the two cutters are therefore located in the same plane.

In Fig. 7, the two cutters are shown at 35 and 36. Each cutter is pivotally mounted upon one of the blocks 9 and a spring 37 is connected at its ends to the two cutting-blades to normally retract them away from their cutting-blocks and toward each other. The cutters 35 and 36 are pivotally mounted by securing them on shafts 38 suitably mounted for oscillation and each shaft 38 carries a crank 39 having a roller 40 mounted in its end. The two rollers 40 bear on the periphery of a cam 41 carried by a shaft 42 mounted for rotation in suitable bearings carried by the table 1. The shaft 42 is rotated in any suitable manner from the power-shaft 19, as by a chain 43 running on sprockets mounted on shafts 42 and 19. The cam 41 has spirally-arranged surfaces on opposite sides thereof which engage and actuate the rollers 40 so as to move the cutters 35 and 36 in the cutting direction. Immediately beyond these spiral surfaces are depressions which permit the spring 37 to withdraw the cutters far enough to prevent them from interfering in any way with the parts of the link-forming devices. In the present instance, the wires are shown as fed into position by feeding-rollers 46 (Fig. 4), which are geared together. The shaft of one of these gears carries a ratchet-wheel 47, with which coacts a pawl 48 carried by a vertically-disposed rod 49. The lower end of this rod is connected to a pivoted lever 50, which is held by a spring 51 upwardly and in engagement with a cam 52 carried by the power-shaft 19.

By reference to Figs. 5 and 6, it will be seen that the cutter is not a thin blade, but instead has the sides thereof adjacent to the cutting edge disposed at a substantial angle one to the other.

The operation of the machine will now be described. In each rotation of the power-shaft, the lever 50 and rod 49 are operated so as to cause the wires 53 to be fed forward through the bushings 33 between the anvils 21 and the adjacent ends of the plungers 10. The arrangement of these parts is such that the wires are fed directly in front of the cutting-blocks 34 and close to the anvils 21, so as to be practically in contact with both of these parts. Immediately after this occurs, a slight incline upon the cam-surface of the cam 18, such as is indicated at 54 in Fig. 1, comes into coaction with the roller 17 and causes the member 16 to be raised slightly. This rocks the levers 14 slightly and moves the plungers 10 toward each other a distance sufficient to carry their inner ends into contact with the wires lying between them and the anvils 21. In this way, each piece of wire projecting into the opening in one of the blocks 9 is gripped between a plunger 10 and anvil 21 sufficiently to cause it to be held against turning on its axis. To facilitate holding the wire thus, each plunger 10 preferably has a semicircular groove across the operative face thereof. Beyond the incline 54, the surface of the cam 18 is concentric for a short distance, so that after the plungers 10 have moved up to the position for gripping the wires they remain stationary momentarily. During this time, when the plungers 10 are stationary, the cam 41 operates the cutters 35 and 36, so as to cause them to cut the wires against the cutting-blocks 34. Immediately after cutting the wires, the cutters 35 and 36 are moved away from the wires a substantial distance, but the wires are held between the plungers 10 and anvils 21. Immediately thereafter, the cam 18 causes further upward movement of member 16 and further inward movement of the plungers 10 and die-rods 11. As each plunger and its die-rod move inwardly thus, the piece of wire is curved about the anvil 21 and the ends of the piece of wire are carried around against the converging sides of the anvil by the spring-fingers or prongs 32. Just as the semicircular groove in the end of the die-rod 11 comes in close proximity to the anvil 21, so that the partially formed link is gripped between the die-rod and the anvil 21, the screw 23 on the plunger 10 engages the lever 20 and operates the latter so as to depress the anvil 21 and carry the latter out of the path of movement of the die-rod. When the anvil has been moved downwardly thus, the screw 23 comes into engagement with the wall of block 9, so that further inward movement of plunger 10 is arrested. The upward movement of member 16 effected by cam 18 is, however, continued and effects inward movement of the die-rods 11 independently of the plungers 10. Such inward movement of each die-rod 11 carries the partially formed link with it, the link being held with its bight in the semicircular groove in the end of the die-rod by the spring-fingers 32. While each die-rod 11 is being moved inwardly in this manner, the rod 26 operates to project the die-members 24 slightly. The partially completed link is then in the form of a staple and as it is advanced by the die-rod 11 its ends are projected through links of the mesh on the mandrel 2 and then engage a semicircular groove in the die-member 24. The further movement of the die-rod is effected independently of the sleeve 29, whose movement is arrested by the die-member 24, and the ends of the link are forced into the groove in the die-member 24, so that the link is caused to assume circular form. Immediately thereafter, the member 16 moves downwardly, retracting the die-rods 11. As those rods move outwardly, the sleeves 29 engage the ends of the recesses in which they lie, so that the sleeves are caused to move relatively to the die-rods to their initial positions with their spring-fingers projecting beyond the ends of the die-rods. Also, during the outward movement of each die-rod the stud 27 thereon engages the end of the groove 28 in the plunger 10 and causes the plunger 10 to move to its initial position. As rod 26 is moved downwardly, the springs 25 retract the die-members 24 to their former positions. These movements having taken place, the sleeve 3 will be rotated one step, so as to carry the sleeve of mesh around one step and thus bring into coaction with the link-forming devices the proper points upon the sleeve of mesh where links should be added. As this occurs, the lengths of wire are fed forward again and the operation as above described is repeated.

Fig. 8 shows a straight piece of wire with its ends cut square, and also a link made therefrom. As will be seen, the joint between the ends of the link is an imperfect one, in which there is substantial space between the ends on the outer side of the link. The machines for making link-mesh fabric heretofore used with which I am familiar have employed pieces of wire such as that shown in Fig. 8. In accordance with the present invention, a piece of wire is used for making each link, having its ends cut as indicated in Fig. 9, wherein it will be seen that the ends are cut at an incline and that the length of the wire on one side is substantially greater than its length on the opposite side. When this piece of wire is bent to form a ring, it assumes the shape shown in the lower portion of Fig. 9, wherein it will be seen that the two ends come together so as to abut over the entire surfaces thereof. In other words, the difference between the length of the piece of straight wire shown in Fig. 9 on the one side and on the opposite side thereof is the same as the difference between the internal and external circumference of the ring. The mesh made in accordance with Fig. 9 will, therefore, be much more attractive in appearance than that made in accordance with Fig. 8, for the joints between the ends of the ring will show to a far less extent. Furthermore, when solder-core wire is used, the joint in the ring shown in Fig. 9 may be completely closed and concealed, whereas the joint in the ring shown in Fig. 8 cannot readily be so closed, as the space to be filled by the solder is too great. When links such as are shown in Fig. 9 are made from solder-core wire, the entire space between the ends of the links will be filled by the solder of the core, so that not only is the joint in the link entirely concealed, but also the links and the mesh as a whole possess greatly increased strength.

Having described my invention, what I claim as new therein and desire to secure by Letters Patent of the United States is:

1. A machine for making links, comprising the combination of link-forming tools, a feeder for feeding a length of wire thereto, a cutter for cutting pieces from said wire which are longer on one side than on the other, and means for operating said tools to form said pieces into links with the longer sides of the pieces forming the outer sides of the links, substantially as set forth.

2. A machine for making link-mesh, comprising the combination of a support for the mesh, link-forming tools adjacent thereto, means for moving the mesh and tools relatively step by step to present different points on the mesh to the tools, a feeder for feeding a length of wire to the tools, a cutter for cutting pieces from said wire which are longer on one side than on the other, and means for operating said tools to form said pieces into links with the longer sides of the pieces forming the outer sides of the links and simultaneously link them with the links of the mesh on said support, substantially as set forth.

3. A machine for making links, comprising the combination of link-forming tools, a feeder for feeding a length of wire thereto, a cutter for cutting pieces from said wire which are longer on one side than on the other, and means for operating said tools to grip the wire before it is cut and after the cut to form the piece into a link with the longer side of the piece forming the outer side of the link, substantially as set forth.

4. A machine for making link-mesh, comprising the combination of a support for the mesh, link-forming tools adjacent thereto, means for moving the mesh and tools relatively step by step to present different points on the mesh to the tools, a feeder for feeding a length of wire to the tools, a cutter for cutting pieces from said wire which are longer on one side than on the other, and means for operating said tools to grip the wire before it is cut and after it is cut to form the piece into a link with the longer side of the piece forming the outer side of the link and simultaneously link it with links of the mesh on said support, substantially as set forth.

5. A machine for making links, comprising the combination of link-forming tools, means for successively supplying to said tools pieces of wire which are longer on one side than on the other, and means for operating said tools to form said pieces into links with the longer sides of the pieces forming the outer sides of the links, substantially as set forth.

6. A machine for making link-mesh, comprising the combination of a support for the mesh, link-forming tools adjacent thereto, means for moving the mesh and tools relatively step by step to present different points on the mesh to the tools, means for successively supplying to said tools pieces of wire which are longer on one side than on the other, and means for operating said tools to form said pieces into links with the longer sides of the pieces forming the outer sides of the links and simultaneously meshing said links with the links of the mesh on said support, substantially as set forth.

7. A machine for making links, comprising the combination of link-forming tools, a feeder for feeding a continuous length of wire step by step to said tools, a cutter having a wedge-shaped cutting edge, means for operating the cutter after each step movement of the feeder to cut pieces from the wire, and means for operating said tools to form each piece so cut into a link with the longer side of the piece forming the outer side of the link, substantially as set forth.

8. A machine for making link-mesh, comprising the combination of a support for the mesh, link-forming tools adjacent thereto, means for moving the mesh and tools relatively step by step to present different points on the mesh to the tools, a feeder for feeding a continuous length of wire step by step to said tools, a cutter having a wedge-shaped cutting edge, means for operating the cutter after each step movement of the feeder to cut pieces from the wire by movement away from said support, and means for operating said tools to form each piece so cut into a link and simultaneously mesh the link with links of the mesh on said support, substantially as set forth.

9. A machine for making link-mesh, comprising the combination of a support for the mesh, link-forming tools adjacent thereto, means for moving the mesh and tools relatively step by step to present different points on the mesh to the tools, a feeder for feeding a continuous length of wire step by step to said tools, a cutter having a wedge-shaped cutting edge, means for operating the cutter after each step movement of the feeder to cut pieces from the wire by movement away from said support, and means for operating said tools to grip the wire before it is cut and after the cut to form the piece into a link and simultaneously link it with links of the mesh on said support, substantially as set forth.

10. A machine for making link-mesh, comprising the combination of a support for the mesh, a reciprocating forming-tool movable toward and away from the support, means for moving the mesh on said support and said tool relatively step by step to present different points on the mesh to said tool, a feeder for feeding wire between the tool and support, a cutter having a wedge-shaped cutting edge located between the wire so fed and the support, means for operating the cutter after each feeding movement of the feeder to cut the wire, and means for moving said tool toward the support after a piece of wire is cut to form the piece into a link and link it with the mesh on said support, substantially as set forth.

11. The combination of a support for a series of links, a die-member movable toward and away from the same, a feeder for feeding wire between the die-member and support, a cutter movable to cut the wire by a movement away from the support, means for operating the feeder and cutter alternately, and means for moving the die-member after each operation of the cutter to carry the piece of wire so cut to the support and mesh it with a link thereon, substantially as set forth.

12. The combination of a support for a series of links, a die-member movable toward and away from the same, an anvil normally located between the support and the adjacent end of the die-member, means for feeding wire between the die-member and anvil, a cutter movable to cut the wire by a movement away from the support, means for operating the feeder and cutter alternately, means for moving the die-member after each operation of the cutter to form the piece of wire so cut about the anvil and then carry it to and mesh it with a link on said support, and means for moving the anvil out of and into the path of movement of the die-member, substantially as set forth.

13. The combination of a support for a series of links, a die-member movable toward and away from the same, an anvil normally located between the support and the adjacent end of the die-member, means for supplying pieces of wire which are longer on one side than on the opposite side between said anvil and the adjacent end of the die-member with the shorter side toward said support, means for moving the die-member after each operation of the cutter to form a piece of wire about said anvil and then carry the formed piece to and mesh it with a link on said support, and means for moving the anvil out of and into the path of the die-member, substantially as set forth.

14. The combination of a support for a series of links, a die-member movable toward and away from the same, an anvil normally located between the support and the adjacent end of the die-member, means for feeding a continuous length of wire step by step between the anvil and die-member, a cutter having a wedge-shaped cutting edge movable away from the support to cut a piece from said wire, means for operating the cutter and feeder alternately, means for moving the die-member after each operation of the cutter to form the piece of wire cut by the cutter about said anvil and then carry the formed piece to and mesh it with a link on said support, and means for moving the anvil out of and into the path of the die-member, substantially as set forth.

This specification signed and witnessed this 16th day of July, 1912.

ALPHONSO C. PRATT.

Witnesses:
CHARLTON M. PRATT,
FREDERICK L'HOMMEDIEU.